United States Patent [19]

Endo

[11] Patent Number: 5,010,440

[45] Date of Patent: Apr. 23, 1991

[54] PIPE LINER HAVING ELECTRICALLY CONDUCTIVE WIRES FOR HARDENING AND ELECTROSTATIC BUILD-UP PREVENTION

[76] Inventor: Mamiko Endo, Kita-Kasukabe Haitsu, 368, Umeda, Kasukabe-shi, Saitama-ken, Japan

[21] Appl. No.: 446,889

[22] Filed: Dec. 6, 1989

[30] Foreign Application Priority Data

Dec. 9, 1988 [JP] Japan .................................. 63-310160

[51] Int. Cl.⁵ .................... H05F 1/00; F16L 11/12; F16L 55/18; F16L 55/16
[52] U.S. Cl. .................................... 361/215; 174/47; 138/97; 138/98; 264/27; 264/36; 264/516
[58] Field of Search .................. 361/215; 264/27, 36, 264/269, 516, 521; 29/402.07; 156/294; 405/150; 174/47; 138/33, 97, 98

[56] References Cited

U.S. PATENT DOCUMENTS

| | | | |
|---|---|---|---|
| 3,560,295 | 2/1971 | Kimbrell et al. | 264/516 |
| 3,971,416 | 7/1976 | Johnson | 174/47 |
| 4,622,196 | 11/1986 | Wood | 264/269 |
| 4,671,840 | 6/1987 | Renaud | 425/46 |
| 4,867,921 | 9/1989 | Steketee, Jr. | 264/36 |
| 4,921,648 | 5/1990 | Soni et al. | 264/36 |

FOREIGN PATENT DOCUMENTS 2832547  7/1978  Fed. Rep. of Germany ...... 361/215

Primary Examiner—J. R. Scott
Assistant Examiner—Richard T. Elms
Attorney, Agent, or Firm—Lowe, Price, LeBlanc, Becker & Shur

[57] ABSTRACT

A pipe liner for lining an underground pipe is disclosed, which mainly consists of an electrically conductive flexible tube impregnated with a thermosetting resin, and conductive wires, and is characterized in that the thermosetting resin is hardened by means of electric heating of the electrically conductive flexible tube on which the conductive wires are laid.

8 Claims, 3 Drawing Sheets

PIPE LINER HAVING ELECTRICALLY CONDUCTIVE WIRES FOR HARDENING AND ELECTROSTATIC BUILD-UP PREVENTION

FIELD OF THE INVENTION

The present invention relates to a pipe liner, and a use of the same pipe liner to repair a defective pipe by internally lining it.

DESCRIPTION OF THE PRIOR ART

When an underground utility pipe or an underground industrial pipe, such as sewer pipe, gas pipe, and electric conduit pipe, is defective, the pipe is repaired and refreshed without digging and disassembling the sections of the pipe. This method of repairing a pipe is known and practiced in the field of civil engineering. Typically, the method is disclosed by Japanese Provisional Patent Publication (Kokai) No. 60-242038.

According to the publication, this method of pipe repair comprises inserting a sufficiently long tubular flexible liner into the defective pipe by fluid pressure. The tubular liner is made of a flexible resin-absorbable material impregnated with a hardenable resin, and has the outer surface coated with a hermetic film. More particularly, according to the publication, the tubular flexible liner is closed at one end and open at the other. The tubular flexible liner is first flattened. The closed end of the tubular liner is tied to a control rope. The open end of the tubular liner is made to gape wide and hooked at the end of the defective pipe in a manner such that the wide-opened end of the liner completely and fixedly covers and closes the pipe end. Then, a fluid with pressure is applied to the tubular liner such that the fluid urges the tubular liner to enter the defective pipe. Since one end of the tubular liner is hooked at the end of the pipe, it remains there while the rest of the flexible liner is turned inside out as it proceeds in the pipe. (Hereinafter, this manner of insertion shall be called "reversing".) When the entire length of the tubular liner is reversed (or turned inside out) in the pipe, the control rope holds the closed end of the tubular liner to thereby control the length of the tubular liner in the pipe. Then the reversed tubular liner is pressed against the inner surface of the defective pipe, and the tubular flexible liner is hardened by heating, or by some other procedure depending on the hardening property of the material of the liner. In this manner it is possible to line the inside wall of the defective pipe with a rigid liner without digging the ground and disassembling the pipe sections.

However, in the case where a thermosetting resin is used as the hardenable resin impregnated in the flexible lining material used in the reversing operation, the thermosetting resin is hardened by means of an indirect heating using a fluid heat transfer medium such as water and air, so that a considerable amount of heat energy and time are required for hardening the flexible lining material; also it takes another considerable time to wait for the heat transfer medium to cool down, especially in the case of water. Consequently, with this conventional heating method, the operation efficiency is poor and the operation cost is high.

What is more, if the thickness of the flexible tubular liner is comparatively large, a considerable temperature difference (or gradient) occurs between the inner surface of the liner which is in contact with the heat transfer medium and the outer surface of the liner which is in contact with the inner wall of the pipe, and this temperature difference gives rise to a distortion in the liner till on a worst occasion the liner cracks.

Therefore, this invention was contrived in view of the above problem, and it is an object of the invention to provide a pipe liner which is adapted to harden promptly and uniformly without a use of an external heating medium, so that only a small amount of energy is required for the hardening of the liner, and the liner is safe from cracking.

Also, it is an object of the invention to provide a manner of use of the above inventive pipe liner, whereby the operation efficiency is improved and operation cost is reduced.

SUMMARY OF THE INVENTION

In order to attain the above-described objects and others, the inventor contrived a pipe liner (1) with which a pipe is internally lined, comprising:
  a resin-absorbable flexible tube (2) made of electrically conductive material,
  an electrically insulating means (7) which is provided along at least one generating line of said resin-absorbable flexible tube and penetrating through the whole thickness thereof, so as to electrically disconnect the circumferential circuit formed by said resin-absorbable flexible tube at said at least one generating line,
  a thermosetting resin absorbed in said resin-absorbable flexible tube,
  at least one pair of wires (6) having an electrical conductivity greater than that of said resin-absorbable flexible tube, said at least one pair of wires being laid on, and passed along the whole length of, said resin-absorbable flexible tube, and being arranged such that the wires of the same pair are close to each other but are electrically isolated from each other by said electrically insulating means, and
  an electrically insulating hermetic film (4) which forms the innermost layer of said pipe liner, when the pipe liner is inserted in the pipe.

The following is a description of the pipe liner of the invention in terms of how it can be fabricated:
  one or more belt-shaped strip(s) of electrically conductive, resin-absorbable material is electrially insulated by means of an electrically insulating means (7) along the lengthy side edges of the strip(s),
  the side edges of the strip(s) are connected to each other such that the strip(s) forms a flexible tube (2),
  as many pairs of wires (6), having an electrical conductivity greater than that of said resin-absorbable flexible tube, as the number of strips of resin-absorbable material are laid on, and passed along the whole length of, said flexible tube (2) such that the wires of the same pair are close to each other but are electrically isolated from each other by said electrically insulating means,
  the outermost surface of the flexible tube is covered with an electrically non-conductive hermetic film (4),
  the resin-absorbable flexible tube is impregnated with a thermosetting resin, and
  one end of the tube thus made is sealed.

According to the other aspect of the invention, the manner of use of the above inventive pipe liner comprises the steps of:

(a) inserting the inventive pipe liner into a defective pipe by reversing the pipe liner by means of a fluid pressure, (b) applying a voltage between the two wires, if there are only two, or between each two wires which are not isolated from each other by said insulating means, if there are two or more pairs of wires, while the flexible material is pressed against the inner wall of the pipe by means of a fluid pressure, and (c) cutting the both ends of the pipe liner.

When electricity is conducted through each circuit formed of respective two wires and the strip of electrically conductive resin-absorbable flexible material on which the two wires are laid, the electricity travels from one wire to the other wire by way of the whole width of the strip. Since the both lengthy sides of each flexible strip is insulated by insulating means the electricity cannot go from one wire to the closest neighboring wire that is across the insulating means, but has to go all the way through the width of the strip to reach the other neighboring wire.

If there are only one pair of conductive wires (as in the case of the emodiment described hereinbelow), electricity is conducted through the two wires, whereby the electricity travels from one wire to the other by way of the whole width of the electrically conductive flexible material which is curled into a tubular from. Since the both lengthy sides of the flexible material are insulated, the electricity cannot take a shorter way but has to go round from side to side of the tubular flexible material.

Thereby, due to the resistivity of the resin-impregnated flexible material, the entire length and width of the tubular pipe liner is electrically heated uniformly, so that the thermosetting resin absorbed in the resin-absorbable flexible material is directly heated and thus promptly and uniformly hardened. As a result, a highly rationalized pipe repair operation can be conducted, and since the thermosetting resin permeated through the electrically conductive flexible material is uniformly heated by electricity, there occurs little temperature gradient in the liner so that there is little chance of cracking to develop in the hardened flexible material. Also, since there is no need of using a large quantity of heat medium to heat the thermosetting resin, it is possible to minimize the heating facility, and energy consumption can be greatly reduced. Thus, a considerable economization in repairing operation is attained.

The above and other objects and features of the invention will appear more fully hereinafter in the following description given in connection with the accompanying drawings and the novelty thereof pointed out in the appended claims.

DETAILED DESCRIPTION OF THE INVENTION

Now, an embodiment of the invention shall be explained with reference to the attached drawings.

Figure 1:
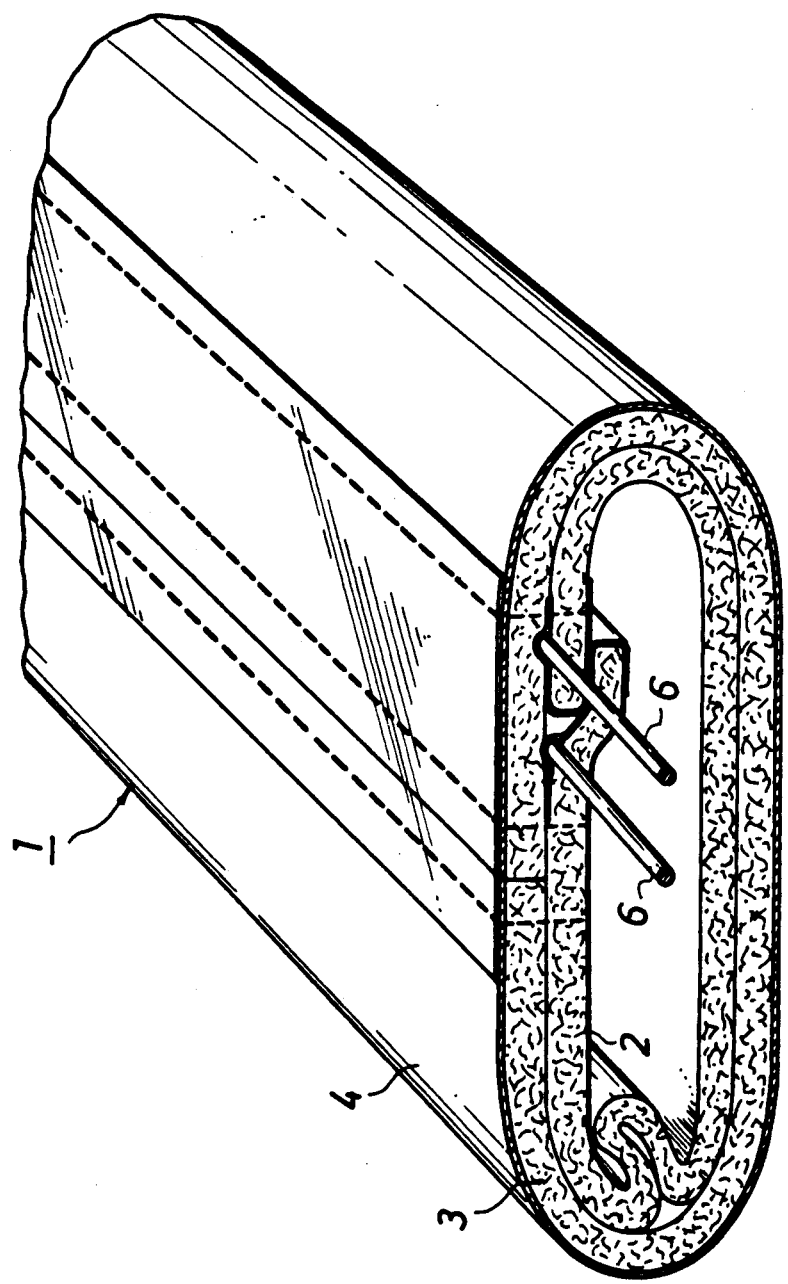
FIG. 1 is a perspective view of a pipe liner according to the invention.
Figure 2A:
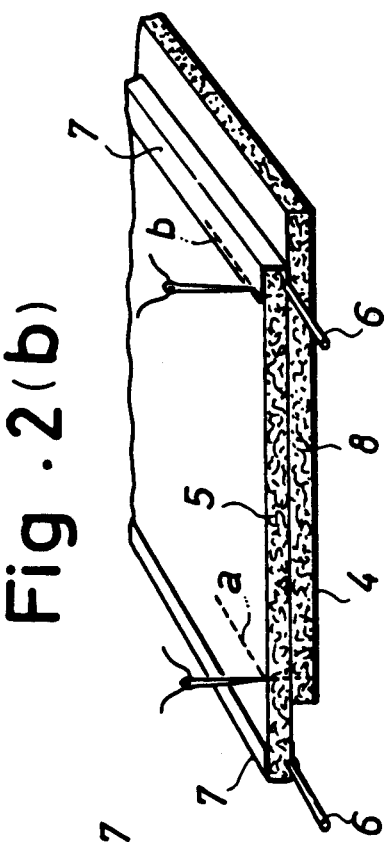
FIG. 2 is a set of perspective drawings of lining materials useful for explaining the procedure for making the pipe liner of FIG. 1.
Figure 2B:
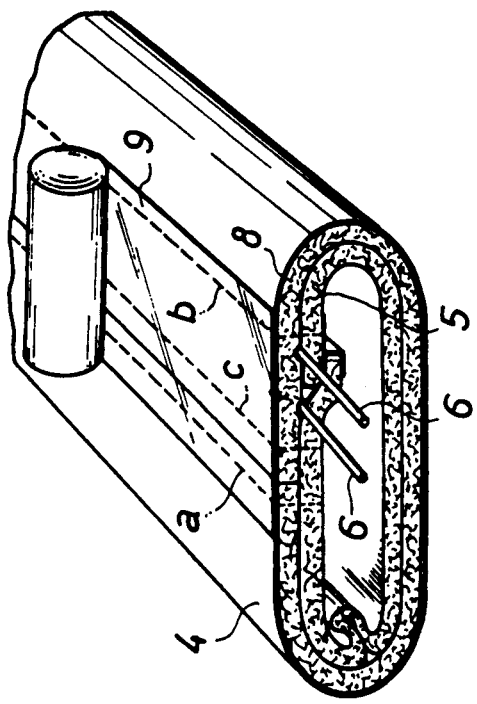
Figure 2C:
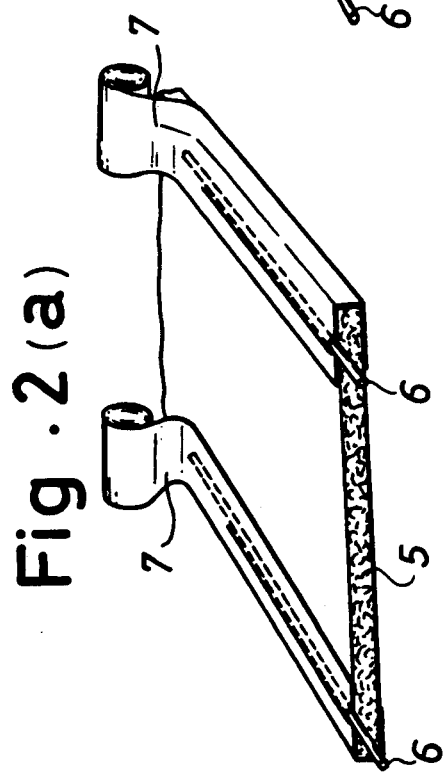
Figure 2D:
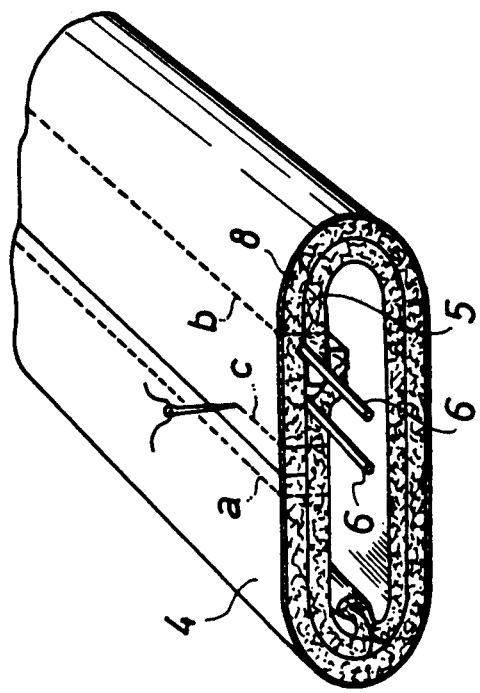

FIG. 1 is a perspective view of a pipe liner according to the invention; FIG. 2 shows a set of drawings (a) through (d) useful for explaining the procedure for making the pipe liner of FIG. 1.

A pipe liner 1, which is fabricated in accordance with the invention, consists of a tubular conductive lining layer 2, another tubular lining layer 3 which mantles the lining layer 2, and an air- and water-tight film 4 which hermetically covers the lining layer 3. The film 4 is electrically non-conductive. (The hermetic film 4 with which the lining layer 3 is coated may be made of urethane, polyester elastomer, or an organic silicon.)

More particularly, the pipe liner 1 is fabricated in the procedure illustrated by the drawings (a) through (d) of FIG. 2. In FIG. 2 (a), reference numeral 5 designates a lengthy rectangular resin-absorbable flexible material endowed with electrical conductivity. Thus, this conductive material 5 constitutes the lining layer 2 of FIG. 1, and can be a nonwoven fabric made from polyester felt mixed with carbon fiber, for example. Laid on one side of, and close to the respective lengthy sides of, the resin-absorbable conductive material 5 are two copper wires 6, 6, which are more electrically conductive than the resin-absorbable flexible material 5. The copper wires 5 are fixed on the surface of the felt 5 by means of strips of insulating tape 7 which is coated with an adhesive material on one side. Incidentally, more strips of the insulating tape 7 are used such that the tape 7 covers not only the copper wires 6, 6, but also wraps round the lengthy side edges of the felt 5 as shown in FIG. 2 (a). Therefore, the tape 7 electrically insulates the side edges of the conductive felt 5.

A resin-absorbable material 8 having a similar dimension as the resin-absorbable material 5 is prepared. This resin-absorbable material 8 constitutes the lining layer 3, and is a felt made of polyester. One side of the felt 5 is coated with a hermetic film layer 4.

Next, the resin-absorbable material 5 is put on the resin-absorbable material 8 in the manner as shown in FIG. 2 (b). In particular, that side of the felt 5 which carries the copper wires 6, 6 is contacted with that side of the felt 8 which is not coated with the film 4. Also, the felts 5 and 8 are not overlapped completely with each other but are staggered slightly such that one side edge of the felt 5 is not overlapping on the felt 8, and the wire 6 at said edge of the felt 5 is off the felt 8. Likewise, that side edge of the felt 8 remote from said edge of the felt 5 is not overlapping on the felt 5. The felts 5 and 8 are then sewed together with lengthwise stitches a and b.

Thereafter, the thus combined resin-absorbable felts 5 and 8 are curled up to form a lengthy two-layer tube with the felt 5 forming the inner layer, as shown in FIG. 2 (c). On this occasion, the lengthy side edges of the felt 5 are made to overlap on each other, while the edges of the felt 8 are made to neatly meet with each other without overlapping. Although the edges of the electrically conductive felt 5 are in contact with each other, they are electrically insulated from each other by means of the insulating tape 7. Therefore, the now close and parallel copper wires 6, 6 are by no means closer now in terms of distance in electrical circuit.

Next, felts 5 and 8 are further sewed with a lengthwise stitch c. Then the stitches a, b and c are covered with an adhesive tape 9 which sticks well to the film 4.

Finally, the resin-absorbable materials 5 and 8 are impregnated with a thermosetting resin, and the pipe liner 1 shown in FIG. 1 is obtained.

Next, with reference to FIGS. 3 and 4, a method of repairing a defective pipe with the pipe liner 1 will be explained. Incidentally, FIG. 3 is a cross-sectional view of the site of the pipe repair, and FIG. 4 is a cross-sectional view taken on the plane indicated by IV—IV in FIG. 3.

First, the pipe liner 1 is reversingly inserted in an underground pipe 10 by the known reversing method. When the insertion of the pipe liner 1 is completed, a disc-shaped lid means 11 is put in the open end of the pipe liner 1, and the lid means 11 is fixed there by means of an elastic band 12 so that pipe liner 1 is sealed. A compressed air supply pipe 13 is inserted through the lid means 11 to open in the space S contained in the pipe liner 1. The supply pipe 13 is connected to an air compressor 16 by way of a hose 17. A pressure gage 14 and a pressure regulating valve 15 are also provided at the lid means 11. A control rope 18 which is tied to the front end of the pipe liner 1 is also penetrating through the lid means 11, and is wound up on a reel, not shown.

The two copper wires 6, 6 leading out from the pipe liner 1 are connected to an electric power supply 19 which is installed on the ground. A temperature sensor 20, such as a thermoelectric couple, is buried in the pipe liner 1, and a lead 21 leading out from the temperature sensor 20 in connected to a temperature controller 22 installed on the ground. The temperature controller 22 is electrically connected to the electric power supply 19. Incidentally, the power supply 19 can be of AC or DC power system.

Figure 3:
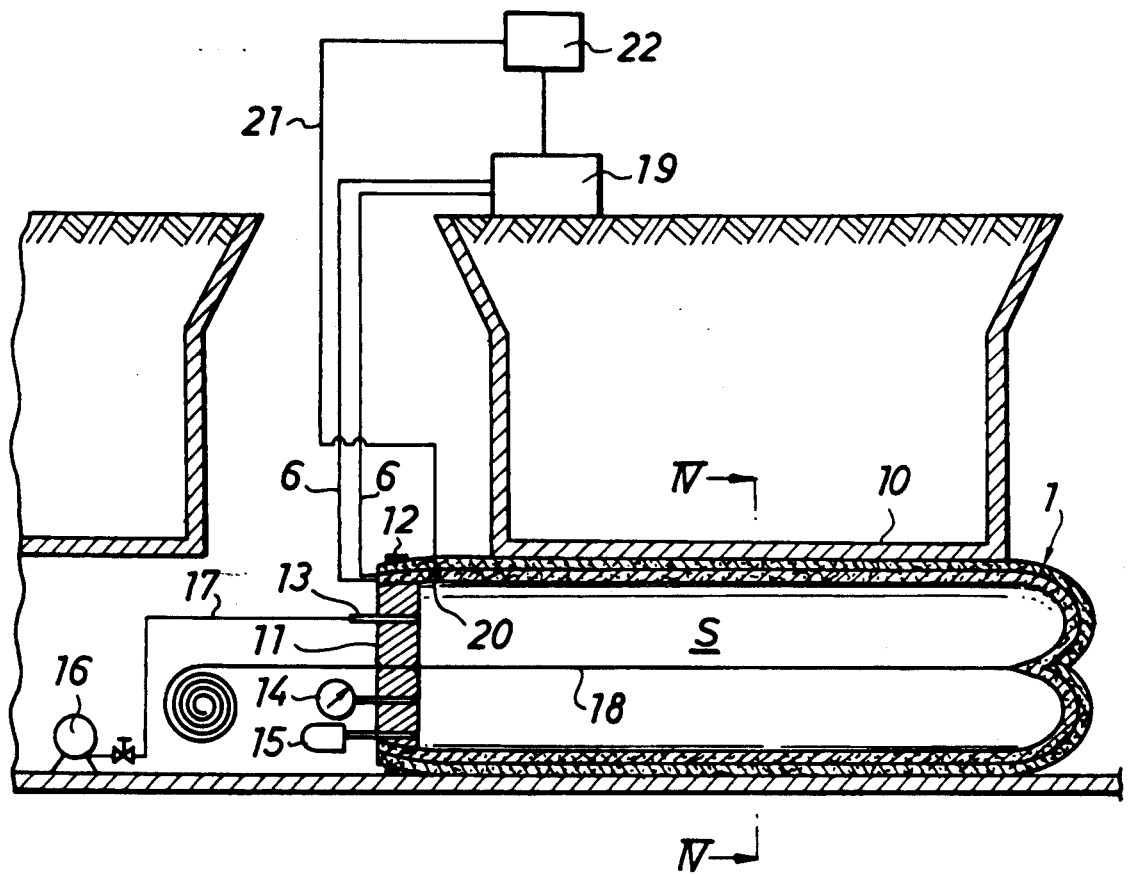
FIG. 3 is a vertical sectional view of a site of the pipe repair in which the pipe liner of the invention is used in the manner of the invention.
Figure 4:
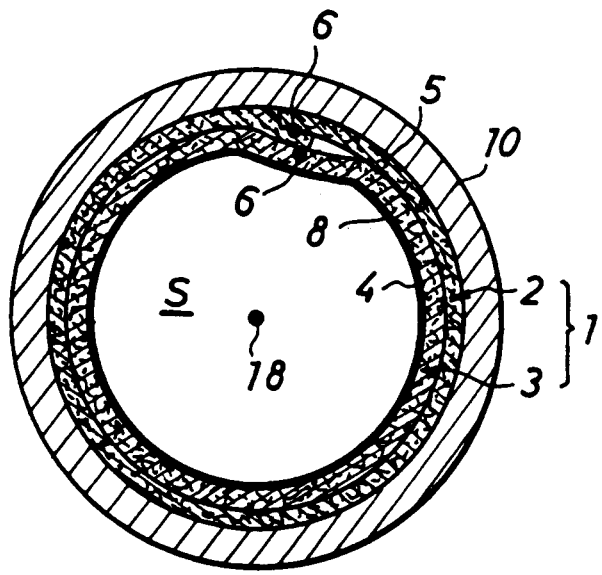
FIG. 4 is a vertical sectional view taken on the plane indicated by IV—IV in FIG. 3.

When all of the above elements are installed, the air compressor 16 is driven and the compressed air supplied therefrom is sent into the space S by way of the hose 17 and the pipe 13, whereby the internal pressure of the pipe liner 1 is increased and the pipe liner 1 is pressed against the inner wall of the defective pipe 10, as shown in FIG. 3. On this occasion, the internal pressure of the pipe liner 1 is measured by means of the pressure gage 14, and when the pressure exceeds a predetermined value, the pressure regulating valve 15 is operated to relieve some air from the pipe liner 1. Thus, the internal pressure of the pipe liner 1 is maintained at a predetermined high value.

Meanwhile the electric power supply 19 is operated to supply electricity through the circuit consisting of the copper wires 6, 6 and the conductive lining layer 2. Now, the electricity flows into one of the copper wires 6 and passes through the lining layer 2 and then through the other copper wire 6 to return to the power supply 19. Since the lengthy edges of the lining layer 2 are electrically insulated by the tape 7 the electricity takes a "round trip" from one edge to the other edge of the lining layer 2. Since the electric conductivity of the lining layer 2 is lower than that of the copper wires 6, 6, electric heating occurs uniformly in the lining layer 2 (or the resin-absorbable material 5) by virtue of the electric resistance of the lining layer 2. Thus heated directly, not only the thermosetting resin absorbed in the lining layer 2 but also the thermosetting resin absorbed in the lining layer 3 hardens simultaneously, promptly and uniformly. Thereby, the defective pipe 10 is closely lined with the hardened lining layers 2, 3, as shown in FIG. 4.

The ends of the pipe liner 1 are cut by conventional methods after removing all the devices from the pipe liner 1, so that the both ends will look more or less like the cross-section shown in FIG. 4.

By the way, to obtain best result and best economy, a temperature of the resin-absorbable material 5 is monitored by means of the temperature sensor 20 continuously, and when the temperature deviates from a predetermined temperature range, the temperature controller 22 controls the amount of the electricity supplied by the power supply 19 such that the temperature of the resin-absorbable material 5 returns to the predetermined temperature range. Thus, the thermosetting resin in the resin-absorbable material 5 is always heated at appropriate temperatures.

Thus, by employing the pipe liner 1 and this liner hardening method, it is possible to conduct a highly effective operation of underground pipe repair. Since, according to the method of the invention, the thermosetting resin hardens promptly and uniformly, heat gradient scarcely occurs in the pipe liner 1 so that after hardening no crack develops in it.

Furthermore, with the operation of this embodiment of the invention, since there is no need of using a large amount of heat medium to heat the thermosetting resin, the heating facility can be simplified and reduced in installation area. Also, the economy is greatly improved, for the energy consumption is much reduced, and the required man power is smaller.

Besides above-stated effects of the invention, it is worth suggesting that, when the both ends of the pipe liner 1 are cut off, if the copper wires 6, 6 are left uncut, they can be useful as terminals for a connection to a power supply, or for grounding. If they are connected to a power supply, the pipe 10 can be heated or warmed at will, and thereby it is possible to avoid various inconveniences such as sticking of oysters, etc. if the pipe is in the sea water. Or by employing the copper wires 6, 6 for grounding, it is possible to prevent accumulation of static electricity in the pipe 1.

The invention being thus described, it will be obvious that the same may be varied in many ways. For example, in the above embodiment the pipe liner 1 comprises two lining layers, one layer being electrically conductive and the other layer being ordinary, it is possible to use only one electrically conductive lining layer to constitute the pipe liner, or the pipe liner can be formed of one electrically conductive lining layer sandwiched between a pair of ordinary lining layers or a pair of sheets made of electrically insulating material. Also, in place of the copper wires 6, 6, it is possible to employ wires of other metals, or thin metallic plates. Such variations are not to be regarded as a departure from the spirit and scope of the invention, and all such modifications as would be obvious to one skilled in the art are intended to be included within the scope of the following claims.

What is claimed is:

1. A pipe liner (1) with which a pipe is internally lined, comprising:
   a resin-absorbable flexible tube made of electrically conductive material,
   an electrically insulating means which is provided along at least one generatrix of said resin-absorbable flexible tube and penetrating through the whole thickness thereof, so as to electrically disconnect the circumferential circuit formed by said resin-absorbable flexible tube at said at least one generatrix, a thermosetting resin absorbed in said resin-absorbable flexible tube, at least one pair of wires having an electrical conductivity greater than that of said resin-absorbable flexible tube, said at least one pair of wires being laid on, and passed along the whole length of, said resin-absorbable flexible tube, and being arranged such that the wires of the same pair are close to each other but are electrically isolated from each other by said electrically insulating means, and an electrically insulating hermetic film which forms the innermost layer of said pipe liner, when the pipe liner is inserted in the pipe.

2. A pipe liner as claimed in claim 1 wherein said resin-absorbable flexible tube is a nonwoven fabric made from polyester felt mixed with carbon fiber.

3. A pipe liner as claimed in claim 1 wherein said resin-absorbable fexible tube is bound to an electrically non-conductive support means to thereby maintain its tubularity.

4. A pipe liner as claimed in claim 1 wherein said insulating means is an insulating tape which is coated with an adhesive material on one side.

5. A pipe liner as claimed in claim 1 wherein said electrically insulating hermetic film is made of urethane, polyester elastomer, or silicone.

6. A pipe liner as claimed in claim 1 wherein said at least one pair of wires are of copper.

7. A pipe liner with which a pipe is internally lined, said pipe liner being fabricated in the following manner:
(a) one or more belt-shaped strip(s) of electrically conductive, resin-absorbable material is electrically insulated by means of an electrically insulating means along the side edges of the strip(s),
(b) the side edges of the strip(s) are connected to each other such that the strip(s) forms a lengthy flexible tube,
(c) as many pairs of wires, having an electrical conductivity greater than that of said resin-absorbable flexible tube, as the number of strips of resin-absorbable material are laid on, and passed along the whole length of, said flexible tube such that the wires of the same pair are close to each other but are electrically isolated from each other by said electrically insulating means,
(d) the outermost surface of the flexible tube is covered with an electrically non-conductive hermetic film,
(e) the resin-absorbable flexible tube is impregnated with a thermosetting resin, and
(f) one end of the tube thus made is sealed.

8. A method of internally lining a pipe with a pipe liner comprising:
a resin-absorbable flexible tube made of electrically conductive material,
an electrically insulating means which is provided along at least one generatrix of said resin-absorbable flexible tube and penetrating through the whole thickness thereof, so as to electrically disconnect the circumferential circuit formed by said resin-absorbable flexible tube at said at least one generatrix,
a thermosetting resin absorbed in said resin-absorbable flexible tube,
at least one pair of wires having an electrical conductivity greater than that of said resin-absorbable flexible tube, said at least one pair of wires being laid on, and passed along the whole length of, said resin-absorbable flexible tube, and being arranged such that the wires of the same pair are close to each other but are electrically isolated from each other by said electrically insulating means, and
an electrically insulating hermetic film which forms the innermost layer of said pipe liner, when the pipe liner is inserted in the pipe,
comprising the steps of:
(a) inserting the pipe liner into the pipe by reversing the pipe liner by means of a fluid pressure,
(b) applying a voltage between the two wires of said at least one pair of wires, while the flexible material is pressed against the inner wall of the pipe by means of a fluid pressure, and
(c) cutting both ends of the pipe liner.

* * * * *